(12) United States Patent
Ballie et al.

(10) Patent No.: US 7,670,420 B2
(45) Date of Patent: Mar. 2, 2010

(54) BINDER OF VEGETABLE NATURE FOR THE PRODUCTION OF MATERIALS FOR BUILDING AND/OR CIVIL ENGINEERING

(75) Inventors: Michel Ballie, Montigny-le-Bretonneux (FR); Jean-Eric Poirier, Montigny-le-Bretonneux (FR); Thierry Delcroix, Eaubonne (FR)

(73) Assignee: Colas, Boulogne-Billancourt (FR)

( * ) Notice: Subject to any disclaimer, the term of this patent is extended or adjusted under 35 U.S.C. 154(b) by 508 days.

(21) Appl. No.: 10/820,004

(22) Filed: Apr. 8, 2004

(65) Prior Publication Data
US 2004/0260057 A1 Dec. 23, 2004

(30) Foreign Application Priority Data
Apr. 8, 2003 (FR) ................... 03.04361

(51) Int. Cl.
*C09D 193/00* (2006.01)
*C09D 193/04* (2006.01)

(52) U.S. Cl. .............. 106/220; 106/222; 106/228
(58) Field of Classification Search ............ 106/222, 106/228, 220
See application file for complete search history.

(56) References Cited

U.S. PATENT DOCUMENTS

| 734,576 | A | | 7/1903 | Lagarde | |
|---|---|---|---|---|---|
| 1,341,490 | A | | 5/1920 | Wester | |
| 2,343,021 | A | * | 2/1944 | Oswald | 106/227 |
| 2,357,016 | A | * | 8/1944 | Miller | 106/222 |
| 2,550,961 | A | * | 5/1951 | Bradley | 106/226 |
| 2,749,247 | A | * | 6/1956 | Sarup et al. | 106/222 |
| 5,021,476 | A | * | 6/1991 | Pinomaa | 524/77 |
| 5,427,615 | A | * | 6/1995 | Jordan | 106/222 |
| 5,762,696 | A | * | 6/1998 | Jordan | 106/226 |
| 6,156,113 | A | | 12/2000 | Pasquier | |

FOREIGN PATENT DOCUMENTS

FR 2 768 150 3/1999

OTHER PUBLICATIONS

Barnes et al, Lipid Technology Newsletter, Apr. 2001.*

* cited by examiner

*Primary Examiner*—David M Brunsman
(74) *Attorney, Agent, or Firm*—Young & Thompson

(57) ABSTRACT

A binder for the production of a layer for road works or civil engineering comprises, with respect to the total weight of the binder:
(a) 2 to 98% in weight of at least one purely natural or modified natural resin, of vegetable origin, having a softening point measured of 30 to 200%;
(b) 98 to 2% in weight of at least one oil of vegetable origin having a viscosity at 25° C. of 50 mPa·s to 1000 Pa·s,
(c) the binder having:
 (c1) either a penetrability at 25° C., of 20 to 300 1/10 mm and a softening point of 30 to 75° C.,
 (c2) or a penetrability at 15° C., of 300 to 900 and a viscosity at 60° C., and
(d) the binder being exempt of any natural or synthetic elastomer and of any thermoplastic polymer.

20 Claims, No Drawings

BINDER OF VEGETABLE NATURE FOR THE PRODUCTION OF MATERIALS FOR BUILDING AND/OR CIVIL ENGINEERING

This invention concerns generally a binder of vegetable nature and its use for the production of materials for building and civil engineering, and in particular materials to produce layers and/or coatings for road works and/or civil engineering.

Today, numerous carriageways, if not most of them, are covered with bituminous coated materials which have proven their capacity to meet the application constraints on the one hand and to the loads related to the traffic and to the weather conditions on the other hand. These coated materials are considered as contrary to this usage and their durability is acknowledged. They are composed of granulates bound together by natural bitumen or additive-modified bitumen, in particular elastomers and/or thermoplastic polymers.

Granulates bound by bitumen are also used in building and civil engineering to form, among other things, tightness layers, pavement coatings, pitch works, coatings for civil engineering works, etc. . . .

Bitumen is used moreover in so-called industrial applications such as tightness, thermal or sound insulation, etc. . . .

Among the properties which confer to the bitumen its qualities of usage as a binder, viscoelasticity plays a fundamental role. It is this quality which enables to find a good compromise between flexibility and rigidity.

Bitumen is a material derived from the transformation of petroleum. Consequently, it is one of the so-called non-renewable raw materials since petroleum is a fossil material.

The materials for civil engineering should be able to keep their properties, in particular viscoelasticity, over a wide spectrum of temperatures comprised between −20° C. and +70° C. It is this feature which makes bitumen popular as a material for civil engineering.

As regards rheology in general and the viscoelasticity in particular, one may consult the chapter <<hydrocarbonated binders>> of the book entitled <<bitumen-based coated materials—Volume 1>> published by USIRF in December 2001.

The document GB-734 576 describes a varnish for the production of coating films with uniformly wrinkled aspect which comprises the reaction product at 175-280° C. of a synthetic or natural resin and of a vegetable oil, the weight of oil being one and a half times that of the resin and of additives such as metal salts (cobalt notably), under strict conditions (vacuum of 10 to 40 mm of Hg or $CO_2$ atmosphere). A solvent such as benzene is added to the reaction product.

Regarding the preparation method and since the product obtained is a varnish which should be applicable as a paint, the product obtained is far more fluid to be used as a binder and does not show the required penetrability features.

The U.S. Pat. No. 5,021,476 describes a binder for the production of elastic street pavement which consists of tall oil resin, a wood resin, and a therebenthine resin, a derivate of such resins or a mixture of such resins or derivates and a mineral or vegetable treatment oil.

To obtain a binder according to U.S. Pat. No. 5,021,476 having adequate cold resistance, the binder should be added an elastomer, for example, a styrene-butadiene elastomer.

Also, to obtain a binder according to U.S. Pat. No. 5,021,476 leading to materials which are not brittle when exposed to the cold and do not soften up When exposed to the heat, the binder should be added at least one thermoplastic polymer, for instance polyethylene, propylene, polyamide or polyester.

Preferably, the binder according to U.S. Pat. No. 5,021,476 includes at the same time a thermoplastic polymer and an elastomer.

It would be therefore desirable to have a binder for the production of materials intended for building and/or civil engineering which exhibits viscoelastic properties comparable to those of bitumen for a wide temperature range, from −20° C. to +70° C., which is of vegetable nature, and preferably formulated from renewable raw materials.

The above objects are met according to the invention by a binder of vegetable nature for the production of materials for building and/or civil engineering which comprises, with respect to the total weight of the binder:

(a) 2 to 98% in weight of at least one purely natural or modified natural resin, of vegetable origin, having a softening point measured according to the standard ISO 4625 of 30 to 200° C., preferably of 80 to 200° C., better of 100 to 200° C., and better still of 120 to 180° C.;

(b) 98 to 2% in weight of at least one oil of vegetable origin having a viscosity at 25° C. of 50 mPa·s to 1000 Pa·s, (c) said binder having:

(c1) either a penetrability at 25° C., measured according to the standard NF EN 1426, of 20 to 300 1/10 mm and a softening point of 30 to 75° C. measured according to the standard NE EN 1427;

(c2) or a penetrability at 15° C., measured, according to the standard NF EN 1426, of 300 to 900 1/10 mm and a viscosity at 60° C., measured according to the standard NF EN 12596 of 2 to 20 Pa·s; et (d) said binder being exempt of any natural or synthetic elastomer and of any thermoplastic polymer.

In particular, the binder according to the invention is exempt of any natural or synthetic elastomer, such as for instance polybutadiene, latex, styrene-butadiene rubber (SBR), styrene-butadiene-styrene (SBS), ethylene vinyl acetate (EVA), etc, and of any thermoplastic polymer such as, for instance, polyolefins (polyethylene, polypropylene), polyamides and polyesters.

The specifications of the bitumens are given in the standard NF EN 12591. They are characterised by a penetrability, measured according to the standard NF EN 1426 and expressed in tenths of millimeter. According to this penetrability, a second parameter is considered to characterise the consistency of bitumens. This may be either the softening temperature, expressed in degrees centigrade and measured according to NF EN 1427, or the viscosity at 60° C. measured according to the standard NF EN 12596 and expressed in Pa·s. The selection between either of both these parameters depends on the penetrability as may be noticed in the standard NF EN 12591. Depending on the usage contemplated, the bitumen is selected in one of the classes defined in the standard NF EN 12591.

The binder according to the invention is intended to replace the bitumen in all the applications of the latter. Therefore, the binder according to the invention is characterised by the same parameters, measured according to the same methods, expressed according to the same units. Therefore, depending on the application contemplated, the penetrability of the binder according to the invention, at 25° C., ranges between 20 and 300 1/10 mm. Its softening temperature varies then between 75° C. and 30° C. The penetrability of the binder according to the invention may also range between 300 and 900 1/10 mm, measured at 15° C. In such a case, the viscosity at 60° C. ranges between 20 and 2 Pa·s.

There is no preferred penetrability range since the penetrability of the binder according to the invention is selected depending according to the application as in the case of bitumen.

The binder according to the invention may be in the form of a water-based emulsion. In such a case, one may use any conventional emulsifier, cationic, anionic or non-ionic or mixtures of emulsifiers.

The resins adequate for this invention are exudated substances by certain vegetables. They may be of fossil origin or so-called harvest origin. They may be used as such (natural resins) or be transformed chemically (modified natural resins). When they are produced by vegetables existing currently, they form renewable raw materials.

Among the purely natural and modified harvest resins, one may quote the accroïd resins, the dammar, the purely natural and modified natural rosins, the rosin esters, the rosin soaps and the metal resinates.

Among the natural rosins, one may quote the fir and wood and tall oil rosins, such as the tall oil pitch.

Among the modified natural rosins, one may quote the hydrogenated, dismutated, polymerised and maleated rosins.

Among the rosin esters, one may quote the esters of glycerol and of natural, hydrogenated, dismutated, polymerised and maleated rosins, and the esters of the pentaerythritol and of natural and hydrogenated rosins.

Among the metal resinates, one may quote the metal carboxylates, for instance of Ca, Zn, Mg, Ba, Pb, Co, obtained from natural or modified rosins, the calcium resinates, the zinc resinates and the mixed resinates composed of calcium and of zinc.

Although it is recommended for the reasons mentioned previously, one may also use for the formulation of the binder according to the invention of the vegetable natural resins of fossil origin.

Among these fossil resins, one may quote the copal resins.

To be useful part in the formulation of the binder according to the invention, the resin should have a softening temperature of 30 to 200° C., better of 80 to 200° C., better still of 100 to 200° C., and preferably of 120 to 180° C.

Generally, one will use preferably resins having a softening temperature of at least 100° C., preferably of at least 120° C., since these lead, after mixture with vegetable oils in adequate proportions, to binders having the viscoelasticity features closest, if not analogue to those of bitumens for a temperature range from −20° C. to +70° C., and without it being necessary to add to the formulation of the binder an elastomer and/or a thermoplastic polymer.

Table I below gather preferred families of resins useful for the invention.

TABLE I

| Name | Type (1) | Softening temperature, ° C. |
|---|---|---|
| Copal of Congo | F | 100 to 180 |
| Copal of Zanzibar | F | 140 to 190 |
| Copal of Benguela | F | 104 to 130 |
| Accroïds | R | 100 to 133 |
| Dammar | R | 75 to 126 |
| Modified rosins | R, T | 125 to 160 |
| Rosin esters | R, T | >120 |
| Rosin esters | R, T | >130 |
| Calcium resinate | R, T | 135 to 170 |

(1) F: Fossil, R: Harvest, T: having been subjected to a chemical transformation Obviously, one may use mixtures of both or more, of the purely natural or modified natural resins according to the invention.

The purely natural or modified resin(s), of vegetable origin account in general 2 to 98%, preferably 25 to 95%, better 30 to 90%, and better still 40 to 70% in weight, with respect to the total weight of the binder.

For more information regarding purely natural and modified natural resins, one may refer to the article of Bernard DELMOND, <<Natural resins>>, Techniques of the Engineer, treaty −−Physical chemical constants>>—K340—1 to 12, May 2002.

As indicated previously, the binder according to the invention still comprises as an essential component one or several oils of vegetable origin.

As it is well-known, the vegetable oils are obtained by pulverization of seeds, kernels, fruits of oleaginous vegetables.

The vegetable oils may be used raw or refined. They may be modified by chemical reactions, as esterification, whereas these oils may be finally modified chemically.

Among the vegetable oils appropriate to the binder according to the invention, one may quote: the oils made of flax, of colza, of sunflower, of soja bean, of olive, of palm, of ricin, of wood, of maize, of gourd, of grape pips, of jojoba, of sesame, of nut, of hazel,: of almond, of shea, of macadamia, of cotton, of lucerne, of rye, of cartham, of groundnut and of copra.

The vegetable oils preferred according to the invention are flax, ricin and wood oils.

The vegetable oils may be used singly or in the presence of a catalyst which accelerates the polymerisation reaction of oil in the presence of oxygen. These catalysts are well-known and are generally organic metal salts such as cobalt, zirconium and manganese, in particular octanoates and naphtenates of these metals.

The vegetable oils appropriate to the binder of the invention have generally a viscosity at 25° C. such as measured on the Brookfield viscometer of 500 mPa·s to 1000 Pa·s, preferably of 50 mPa·s to 500 mPa·s.

Obviously, the viscosity of the oil is selected depending on the resin(s) used to formulate the binder, in order to obtain a binder having the penetrability and the softening point or the viscosity required.

Vegetable oils according to the invention may have iodine indices ranging between 0 and 200.

Table II below specifies vegetable oils preferred for the binder of the invention.

TABLE II

| Name | Viscosity at 25° C. | Comments |
|---|---|---|
| Flax oil | Variable from 10 mPa · s to 20 mPa · s according to their degree of modification | According to their iodine index, oils will be more or less polymerisable. Such polymerisation is caused by the reaction of the double links, carried by the chains of the fat acids which compose these oils, together with oxygen. The qualifier siccative or semi-siccative is used for characterising this property. Siccativation catalysts, metal salts, may be used for accelerating this reaction. |
| Soja bean oil | Viscosity variable from 10 mPa · s to 2 Pa · s | |
| Colza methyl | Kinetic viscosity of the | Obtained by transesterification |

TABLE II-continued

| Name | Viscosity at 25° C. | Comments |
| --- | --- | --- |
| ester | order of 3 to 5 mm2/s to 40° C. | of sunflower oil. Used as gas oil substitute. |
| Dehydrated ricin oil | Viscosity variable from 15 mPa · s to 1 Pa · s | |

Vegetable oil(s) account for generally 98 to 2%, preferably 5 to 75%, better 10 to 60%, and better still 20 to 40% in weight with respect to the total weight of the binder.

The binder according to the invention may also comprise one or several colouring agents colorants such as mineral pigments and organic colorants.

The binder according to the invention may be used for the production of materials for the building and civil engineering, in particular materials to compose layers and/or coatings for road works and/or civil engineering.

Thus, the binder according to the invention may be used for binding granulates between together and possibly for gluing said binder onto the support whereon they are spread.

The binder may be mixed to the granulates before application in order to form coated materials (coating technique), or materials spread on the carriageway before or after spreading the granulates to form the layers or coatings (coating technique).

The word granulate refers to the materials described in the standard XP P 18-540. The aggregates, in the meaning of XP P 98-135, are also liable to be used in combination with the binder according to the invention.

To characterise the coated materials, one uses in particular the description of their granular formulation, i.e. the distribution of the mass of granulates which compose the coated material depending on the granular class.

As regards the bituminous coated materials, the evolutions of the technique have enabled to select granular formulations more capable than others to meet the performance specifications. By performances is meant the properties of the coated materials as may be characterised using the following tests:

| Performance | Test standards | Comments |
| --- | --- | --- |
| Compactability | NF P98-252 | Capacity of the coated material to be implemented with specified compactness |
| Mechanical resistance and water handling | NF P98-251-1 | Durability when exposed to aggressions of the traffic and to the risk of coated material separation |
| Wheel rutting resistance | NF P98-253-1 | Capacity to resist to the creeping related to the application of the traffic |
| Complex module | NF P98-260-2 | Capacity to sustain the loads. |
| Fatigue behaviour | NF P98-261-1 | Capacity to maintain intact the properties of the coated material depending on the repeated application of the loads |

As regards the coated materials composed with the binder according to the invention, one may obviously retain granular formulations which have proven adequate in the case of bituminous coated materials. Certain formulations are standardised: NF P 98-132, NF P 98-131, NF P 98-134, for instances. However, the characteristics of the binder according to the invention enable to review these granular formulations. Therefore, in the case of applications of binder according to the invention one may contemplate any combination of granular classes.

Moreover, in the case of bituminous coated materials, the granulates must comply with specifications relative to their mechanical properties; the corresponding specifications are part of the standard XP P 18-540. In the case of the coated materials with the vegetable binder according to the invention, one may contemplate the use of granulates which would be considered as non-complying for usage in bituminous coated materials.

The quantity of binder according to the invention used for forming the coated materials corresponds to that of bitumen employed conventionally to realise bituminous coated materials.

Thus, the binder according to the invention accounts for generally between 3 and 10% of the total weight of the coated material.

The following examples illustrate this invention.

1. REALISATION OF BINDERS OF VEGETABLE NATURE ACCORDING TO THE INVENTION

1.1 Principe of Production

The vegetable oil is heated to a higher temperature selected of approximately 20 to 50° C., typically of the order of 30° C. higher than the softening temperature of the resin adopted to be part of the composition of the vegetable binder. For instance, to use a resin whereof the softening temperature is 135° C., the oil selected will be heated to a temperature of the order of 165° C. to 170° C.

The resin is here incorporated little by little in the oil. The melange is stirred. Once, all the mass of resin has been introduced, the mixture is stirred for 90 minutes, at the temperature requested.

1.2 Examples of Formulations of Binders According to the Invention

The different resins used to formulate the binders are given in table III below:

TABLE III

| Reference: | Trade name or Nature | Softening temperature, ° C. |
| --- | --- | --- |
| Resin A | Terpene pinene resin Dercolyte ® 135A | 135 |
| Resin B | Modified rosin phenol ester Sylvaprint ® 8785 | 160 |
| Resin C | Rosin resin maleated ester Sylvacote ® 4973 | 106 |

The vegetable oils used are given in table IV.

TABLE IV

| Reference: | Nature | Viscosity Pa · s at 25° C. |
| --- | --- | --- |
| Oil A | Flax oil | 1 |
| Oil B | Wood oil | 3 |
| Oil C | Dehydrated ricin oil | 2.5 |

From the above resins and oils, binders have been formulated according to the invention. The composition of these binders, their penetrability and their softening temperature (point) are given in table V below.

TABLE V

| Components | Binder 1 | Binder 2 | Binder 3 |
|---|---|---|---|
| Resin A | 75% | — | — |
| Resin B | — | 80% | — |
| Resin C | — | — | 65% |
| Oil A | 25% | — | — |
| Oil B | — | — | 35% |
| Oil C | — | 20% | — |
| Properties | | | |
| Penetrability, 1/10 mm | 105 | 42 | 90 |
| Softening temperature, °C. | 41 | 62 | 43 |

The bitumen is frequently emulsified in order to facilitate the usage thereof in various processes such as:

a) Superficial plasters, fastening layers, vulcanisation layers, impregnation, soil and base course treatment, emulsion base course, emulsion coated materials, cold-cast coated materials and generally the processes described in the book <<the emulsions of bitumen. Generals. Applications>> published in 1988 by the French union of bitumen road emulsions.

b) Protection layers for pipe-lines, metal works, concrete works, binder present in the production of thermal and sound insulation boards made of wood particles or of polymer materials and generally the usages described in <<The Shell Bitumen Industrial Handbook>> published by Shell Bitumen in 1995, ISBN 0-9516625-1-1.

The binder according to the invention may easily be emulsified with the emulsifiers used conventionally for emulsifying bitumens. These emulsifiers, or emulsifying mixtures, which may be cationic, anionic or non-ionic, are well-known to the man of the art.

The formulation of the emulsion is selected depending on the application contemplated. This binder emulsion according to the invention may then replace the emulsions of bitumen in their applications.

For exemplification purposes, emulsions have been realised with the binder 1 of table V. The formulations are reported in table VI below. The emulsions have been produced with an emulbitumen-type colloidal grinder, but one may use any conventional emulsifying means.

TABLE VI

| Type of emulsion | Constituents | Composition pour 1000 g of emulsion | Comment |
|---|---|---|---|
| Cationic | Binder 1 | 650 | Dinoram S ® is an emulsifier supplied by Ceca |
| | Dinoram S ® | 2 | |
| | Hydrochloric acid | 2 | |
| | Water | 346 | |
| Anionic | Binder 1 | 600 | Indulin ISE ® and Indulin C ® are products supplied by Westvaco |
| | Indulin ISE ® | 30 | |
| | Indulin C ® | 7 | |
| | Soda | Quantity sufficient to meet pH between 9.5 and 40.5 | |
| | Water | Complement to 1000 | |
| Non-ionic | Binder 1 | 650 | Stabiram 3070 ® is a Ceca product |
| | Stabiram 3070 ® | 20 | |
| | Water | 330 | |

2. EXAMPLES OF USE OF THE BINDERS ACCORDING TO THE INVENTION

In these examples, unless notified to the contrary, all the parts and percentages are expressed in weight.

2.1. Use in Coated Materials

A coated material of semi grained bituminous concrete 0/10, BBSG, has been made from granulates <<Noubleau>> produced by the Roy quarries. The granular formulation was as follows:

| Sand 0/2 | 39% |
|---|---|
| Gravel 2/4 | 18% |
| Gravel 4/6 | 12% |
| Gravel 6/10 | 31% |

The binder 1 according to the invention, described in table V, has been incorporated in this granular formulation at the rate of 5.9 parts of binder for 100 parts of the granular mixture.

Test pieces have been made and characterised. The values of these characteristics have proven complying with those of a class-3 BBSG of the standard NF P 98-130.

Surprisingly, it has also been found that this coated material, made with the binder according to the invention, exhibited improved resistance to carbohydrates in comparison with a coated material of same granular formulation, but whereof the binder was a class 50/70 bitumen. The procedure used for this evaluation is described in <<Coatings resistant to carbohydrates>> published by C. Deneuvillers, J.-F. Gal and F. Létaudin in RGRA n°800 December 2001, p. 34.

2.2. Use in Asphalt

A pavement asphalt has been made by adopting the following formulation:

| Binder 2 according to the invention, Table V: | 8% |
|---|---|
| Filler: | 25% |
| Sand 0/2 | 37% |
| Gravel 2/6 | 30% |

The properties of this asphalt have been, found quite satisfactory for the aim contemplated.

2.3. Use as a Coating Binder

A binder 4 is prepared according to the invention. It has the following composition:

| Resin C | 60% |
|---|---|
| Oil B | 32% |
| Colza methyl ester | 8.8% |
| Cobalt octoate | 0.2% |

Measured according to the standard NF T 66-005, the viscosity of this binder has been found equal to 100 sec at 40° C. This viscosity is adapted to the use of this binder in the coating technique. One has also verified that its consistency evolves with the course of time as required by this type of application.

To do so, one has made 1 mm thick binder samples. These films have been stored in a ventilated stove regulated at 20° C. After 3, 7, 14 and 28 days, the softening temperature of these samples was measured. They are compared in table VII to that of the binder reference 1 given in the patent FR 2 768 150, reputed complying with a usage for coating. This evolution of the softening temperature confirms the possibility of using this binder for coating.

TABLE VII

Evolution of the softening temperature of the binder 4- Comparison with a bituminous binder of equivalent function

| Mellowing time, day | Softening temperature, ° C. | |
|---|---|---|
| | Binder reference 1 of FR 2 768 150 | Binder 4 |
| 3 | 27.45 | 25.0 |
| 7 | 31.25 | 28.5 |
| 14 | 34.3 | 32.0 |
| 28 | Non specified | 35.5 |
| 31 | 37.5 | 40 |

2.4. Use for the Production of Geomembranes or Tightness Sheets

The bitumen between in the composition of reinforced geomembranes such as, for instance, Colétanche® produced by Cold Chon. These bituminous geomembranes enable to insure the tightness of the structure wherein they are employed. They are used for treating the environmental problems:

Dump confinement,
Storage of polluted liquids and lixiviates,
Storage of various waste and notably radioactive waste,
Protection of groundwater tables.

They are also employed in the construction of hydraulic works such as dams, basins and channels.

Bitumen also composes tightness sheets. One may quote as examples the products Alpal® or Hyrène® of the Axter company. These tightness sheets are used in:

Tightness for terrace roofing structures (inaccessible, self-protected or under gravel, terrace roofing structures for gardens, pedestrian zones, private residences . . . );
Tightness of buried walls;
Tightness for civil engineering;
Covering for buildings (residential or industrial).

The binder according to the invention may replace the bitumen without any technical difficulties. The composition of the binder according to the invention is adjusted relative to the characteristics of the bitumen for which it is substituted.

The invention claimed is:

1. A binder for the production of a layer and/or a coating containing aggregates for road works and/or civil engineering, consisting essentially of, based on the total weight of (a) and (b):
    (a) 60 to 80% in weight of at least one natural or modified natural resin, of vegetable origin, having a softening point measured according to the standard EN 1427 of 100° C. to 200° C.;
    (b) 20 to 40% in weight of at least one oil of vegetable origin having a viscosity at 25° C. of 50 mPa·s to 1000 Pa·s,
    (c) optionally one or several coloring agents, and
    (d) the vegetable oil(s) are used (i) without a catalyst or (ii) in the presence of a catalyst selected from the group consisting of cobalt octanoates or naphtenates, zirconium octanoates or naphtenates and manganese octanoates or naphtenates,
    wherein said binder has:
    (e) a penetrability of 25° C., measured according to the standard NF EN 1426, of 20 to 300 1/10 mm and a softening point of 30 to 75° C., measured according to the standard NF EN 1427;
    wherein said binder is exempt of any natural or synthetic elastomer and of any thermoplastic polymer.

2. The binder according to claim 1, wherein the resin has a softening point measured according to the standard EN 1427 of 120 to 180° C.

3. The binder according to claim 1, wherein the natural or modified natural resin of vegetable origin is a harvest resin.

4. The binder according to claim 3, wherein the resin is selected from the group consisting of accroïd resins, dammar, natural or modified natural rosins, rosin esters, rosin soaps and metal resinates.

5. The binder according to claim 4, wherein the rosin esters are polymerized rosin esters and glycerol and/or maleated rosin esters and glycerol and the resinates are calcium resinates.

6. The binder according to claim 1, wherein the natural or modified natural resin of vegetable origin is a fossil resin.

7. The binder according to claim 6, wherein the resin is selected from the group consisting of the copals.

8. The binder according to claim 1, wherein the vegetable oil is an oil selected from the group consisting of colza oil, sunflower oil, soja bean oil, flax oil, olive oil, palm oil, ricin oil, wood oil, maize oil, gourd oil, grape pips oil, jojoba oil, sesame oil, nut oil, hazel oil, almond oil, shea oil, macadamia oil, cotton oil, Lucerne oil, rye oil, cartham oil, groundnut oil, copra oil, and mixtures thereof.

9. The binder according to claim 1, wherein the vegetable oils are used in the presence of the catalyst.

10. The binder according to claim 1, wherein the vegetable oils are used without a catalyst.

11. A binder for the production of a layer and/or a coating containing aggregates for road works and/or civil engineering, consisting essentially of, based on the total weight of (a) and (b):
    (a) 60 to 80% in weight of at least one natural or modified natural resin, of vegetable origin, having a softening point measured according to the standard EN 1427 of 100° C. to 200° C.;
    (b) 20 to 40% in weight of at least one oil of vegetable origin having a viscosity at 25° C. of 50 mPa·s to 1000 Pa·s, and, optionally
    (c) one or several coloring agents,
    (d) at least one catalyst for polymerizing vegetable oil(s),
    wherein said binder has:
    (e1) a penetrability of 25° C., measured according to the standard NF EN 1426, of 20 to 300 1/10 mm and a softening point of 30 to 75° C., measured according to the standard NF EN 1427.

12. The binder according to claim 11, wherein the resin has a softening point measured according to the standard EN 1427 of 120 to 180° C.

13. The binder according to claim 11, wherein the natural or modified natural resin of vegetable origin is a harvest resin.

14. The binder according to claim 13, wherein the resin is selected from the group consisting of accroïd resins, dammar, natural or modified natural rosins, rosin esters, rosin soaps and metal resinates.

15. The binder according to claim 14, wherein the rosin esters are polymerized rosin esters and glycerol and/or maleated rosin esters and glycerol and the resinates are calcium resinates.

16. The binder according to claim 11, wherein the natural or modified natural resin of vegetable origin is a fossil resin.

17. The binder according to claim 16, wherein the resin is selected from the group consisting of the copals.

18. The binder according to claim 11, wherein the vegetable oil is an oil selected from the group consisting of colza, sunflower, soja bean, flax, olive, palm, ricin, wood, maize, gourd, grape pips, jojoba, sesame, nut, hazel, almond, shea, macadamia, cotton, Lucerne, rye, cartham, groundnut, copra, and mixtures thereof.

19. The binder according to claim 11, wherein the catalyst is selected from the group consisting of cobalt salt, zirconium salt, and manganese salt.

20. A binder for the production of a layer and/or a coating containing aggregates for road works and/or civil engineering, consists of, based on the total weight of (a) and (b):
- (a) 60 to 80% in weight of at least one natural or modified natural resin, of vegetable origin, having a softening point measured according to the standard EN 1427 of 100° C. to 200° C.;
- (b) 20 to 40% in weight of at least one oil of vegetable origin having a viscosity at 25° C. of 50 mPa·s to 1000 Pa·s, and, optionally
- (c) one or several coloring agents,
- (d) at least one catalyst for polymerizing vegetable oil(s), wherein said binder has:
- (e) a penetrability of 2500, measured according to the standard NF EN 1426, of 20 to 300¹/₁₀ mm and a softening point of 30 to 75° C., measured according to the standard NF EN 1427.

* * * * *